US007148934B2

United States Patent
Yuan et al.

(10) Patent No.: US 7,148,934 B2
(45) Date of Patent: Dec. 12, 2006

(54) EASY-MAINTAIN REAR PROJECTION TELEVISION

(75) Inventors: Yi-Cheng Yuan, Miao-Li County (TW); Chun-Yao Chen, Miao-Li Hsien (TW); Yung-Chuan Tseng, Miao-Li Hsien (TW); Chih-Chung Kang, Miao-Li Hsien (TW)

(73) Assignee: Coretronic Corporation, Hsinchu (TW)

( * ) Notice: Subject to any disclaimer, the term of this patent is extended or adjusted under 35 U.S.C. 154(b) by 481 days.

(21) Appl. No.: 10/707,801

(22) Filed: Jan. 13, 2004

(65) Prior Publication Data
US 2004/0155988 A1 Aug. 12, 2004

(30) Foreign Application Priority Data
Feb. 12, 2003 (TW) .............................. 92202468 U

(51) Int. Cl.
*H04N 5/64* (2006.01)
(52) U.S. Cl. .................. 348/789; 348/839; 348/787
(58) Field of Classification Search ................ 348/789, 348/739, 836, 839, 787; 312/7.2, 223.1; 353/72, 74, 119; 361/681, 682, 727, 724, 361/686, 752; 248/917, 918
See application file for complete search history.

(56) References Cited

U.S. PATENT DOCUMENTS

| 4,177,484 | A | * | 12/1979 | Boje ........................... 348/789 |
| 5,293,244 | A | * | 3/1994 | Kawaguchi .................. 348/789 |
| 5,631,715 | A | * | 5/1997 | Kirkpatrick et al. ........ 348/839 |
| 5,860,720 | A | * | 1/1999 | Negishi et al. ............... 353/74 |
| 6,157,416 | A | * | 12/2000 | Whitelaw et al. ............ 348/789 |
| 6,337,724 | B1 | * | 1/2002 | Itoh et al. ..................... 349/75 |
| 6,607,275 | B1 | * | 8/2003 | Cimini et al. ................. 353/28 |
| 6,805,447 | B1 | * | 10/2004 | Takeuchi ..................... 353/71 |
| 2004/0263790 | A1 | * | 12/2004 | VanOverloop et al. ........ 353/31 |

* cited by examiner

*Primary Examiner*—Victor R. Kostak
(74) *Attorney, Agent, or Firm*—Winston Hsu

(57) ABSTRACT

A rear projection television includes a casing with a space therein and a plurality of modular units. A plurality of maintenance holes are formed through the casing to communicate with the space. The modular units are positioned in the space to correspond to the maintenance holes. When one component inside the casing needs repairing, only a lid covering the corresponding maintenance hole is dismounted for the user to quickly take the component out, without moving the casing. Thereby, the repair process is simplified with saved repair labor and space.

3 Claims, 7 Drawing Sheets

EASY-MAINTAIN REAR PROJECTION TELEVISION

BACKGROUND OF INVENTION

1. Field of the Invention

The invention relates to a projection TV, and more particularly to a projection TV that is convenient to repair.

2. Description of the Prior Art

Referring to FIG. 1, a conventional rear projection television includes a base 11, a front frame 12 and a rear cover 13. The base 11 has an opening 111 at its top portion. Referring to FIG. 2, main components of the rear projection television such as a light engine, a circuit board, a power supply (not shown) are mounted in a basket 11 via an opening 111. The front frame 12 and a screen (not shown) are assembled onto the basket 11. A reflector is mounted at an inner side of the rear cover 13. The front frame 12 is mounted on a front of the rear cover 13 to complete the assembly of the rear projection television.

A conventional rear projection television usually uses a high-power and high-light flux discharge lamp such as metal halide lamp (MHL) and ultra high pressure mercury arc lamp (UHP) to achieve image output with high brightness and high display quality. However, such a lamp has high power consumption and a short service life. Therefore, the lamp needs to be replaced frequently. Furthermore, a circuit board and a power supply respectively consist of electric devices that may be defective and damaged after use for a period. When the lamp or the electric devices need repairing, the front frame 12 and the rear cover 13 must be dismounted before the devices are taken out from the basket 11 via the opening 111. After the defective or damaged lamp or electric devices have been repaired, they are put in place in the casing and then the front frame 12 and the rear cover 13 are assembled back to the basket 11. For example, when the lamp is to be replaced, the light engine as a whole must be taken out to replace the damaged lamp with a new one. Such a repair method has to change the position of the light engine, the reflector and the screen, adversely affecting the light path. Moreover, frequently moving the light engine tends to damage the electric devices and optical elements inside the casing. As the rear projection television becomes increasingly larger, it requires more repair space and labor expertise.

SUMMARY OF INVENTION

One object of the invention is to provide an easy-to-maintain rear projection television having a casing with a plurality of maintenance holes for quickly dismounting and repairing components inside the television.

Another object of the invention is to provide an easy-to-maintain rear projection television that allows repairing without changing the locations of its rear cover or front frame, thereby saving the maintenance labor and simplifying the repair process.

Furthermore, another object of the invention is to provide an easy-to-maintain rear projection television that includes an electronic unit, an optical module and a set of bulbs that can be replaced without affecting the light projection path.

In order to achieve the above and other objectives, the rear projection television of the invention includes a casing with a space, at least one maintenance hole and a plurality of modular units. The first maintenance hole is formed through the casing and communicates with the space. A lid covers the first maintenance hole from an outside of the casing. The modular units respectively correspond to the holes. Each modular unit includes an electronic unit, a set of bulbs, and an optical module. A guiding element is mounted in the space to form a channel. A guiding piece is mounted at a periphery of the electronic unit to correspond to the guiding element. The set of bulbs includes a fixed basket and a movable basket screwed onto the fixed basket. The movable basket has a dismountable bulb. When one component inside the casing needs repairing, only the lid corresponding to the component is dismounted to expose the corresponding maintenance hole for the user to repair the target component through the maintenance hole.

To provide a further understanding of the invention, the following detailed description illustrates embodiments and examples of the invention, this detailed description being provided only for illustration of the invention. dr

BRIEF DESCRIPTION OF DRAWINGS

The drawings included herein provide a further understanding of the invention. A brief introduction of the drawings is as follows.

DETAILED DESCRIPTION

Figure 1:
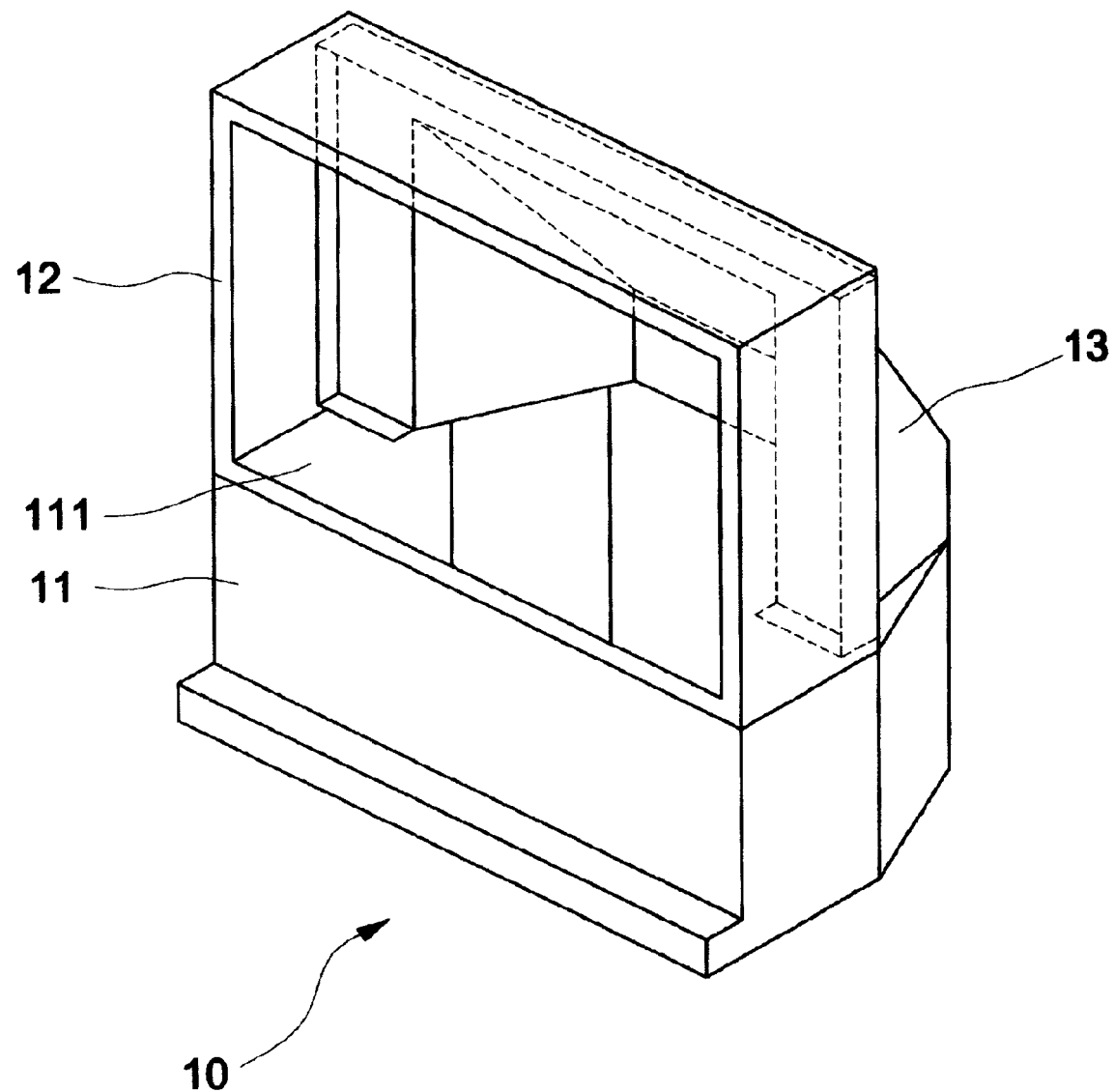
FIG. 1 is a schematic, perspective view of a conventional casing of a rear projection television.
Figure 2:
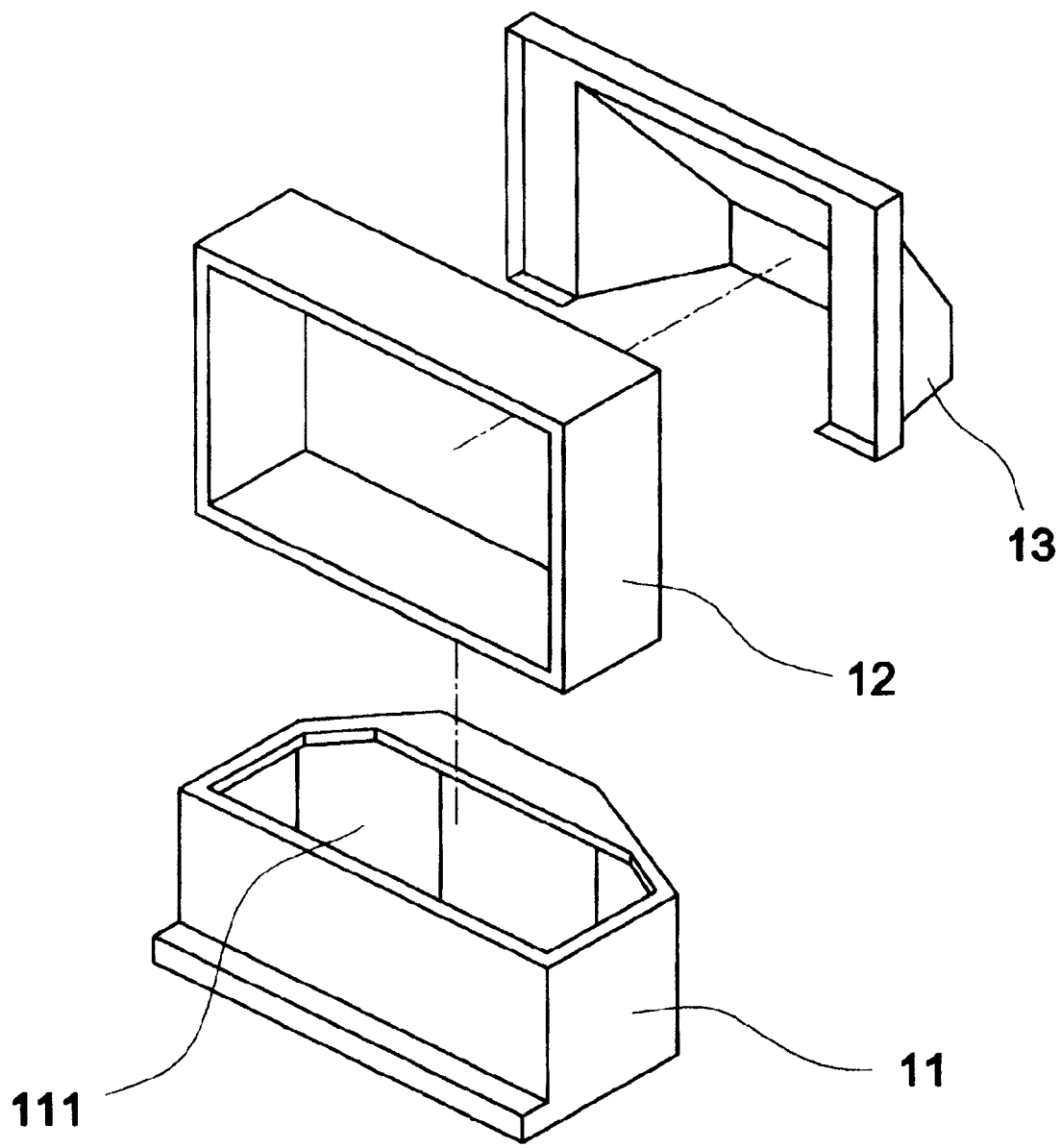
FIG. 2 is an exploded view of a conventional casing of a rear projection television.

Wherever possible in the following description, like reference numerals will refer to like elements and parts unless otherwise illustrated.

Figure 3:
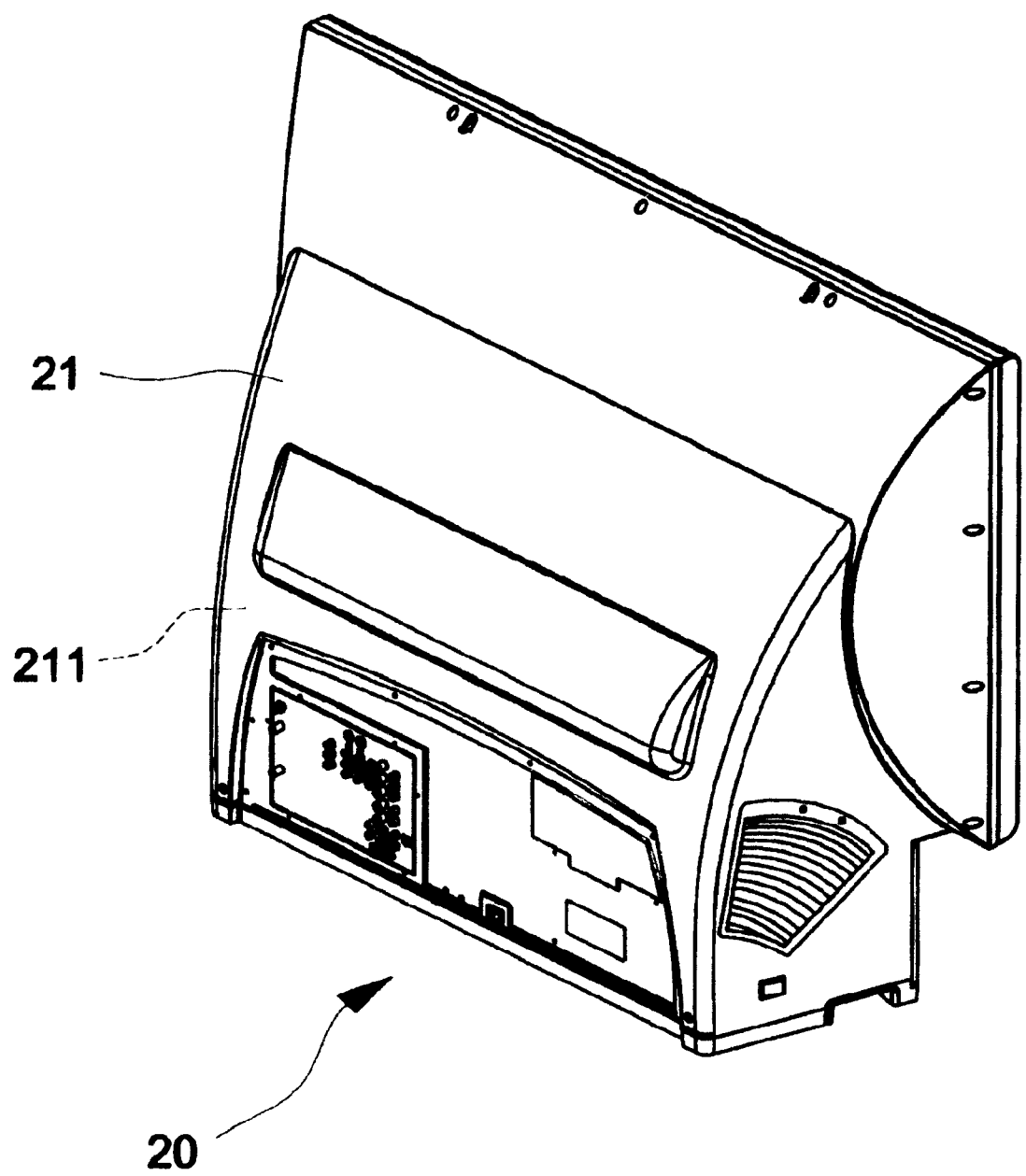
FIG. 3 is a schematic view of a rear projection television.

Referring to FIG. 3, an easy-to-maintain rear projector television 20 according to the invention includes casing 21 and a plurality of module units mounted inside the casing 21. A space 211 is defined in the casing 21 and communicates with a plurality of maintenance holes formed through the casing 21. formed through the casing 21.

Figure 4A:
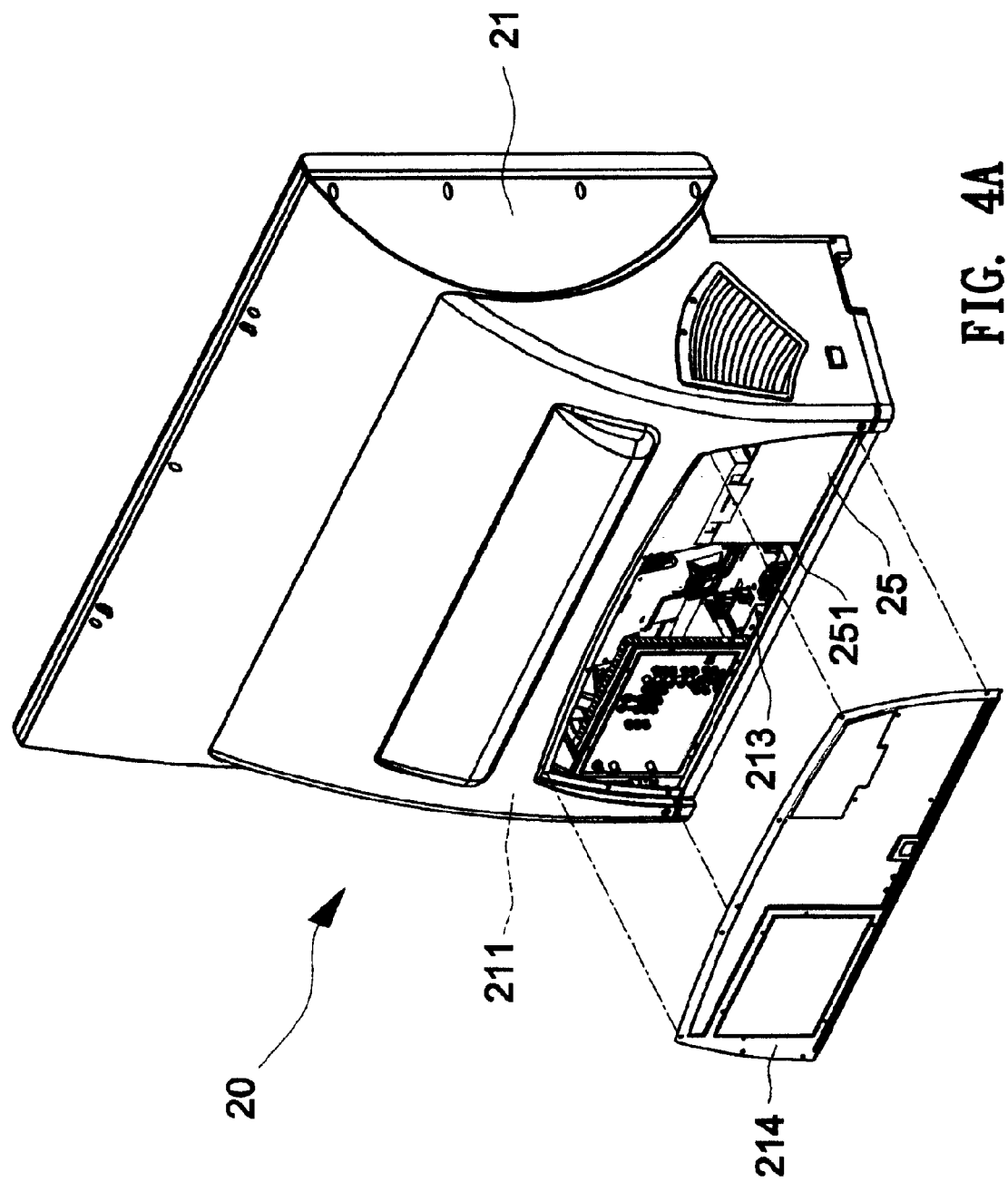
FIG. 4A and FIG. 4B are schematic views of a dismountable electronic unit of an easy-to-maintain rear projection television according to one embodiment of the invention.
Figure 4B:
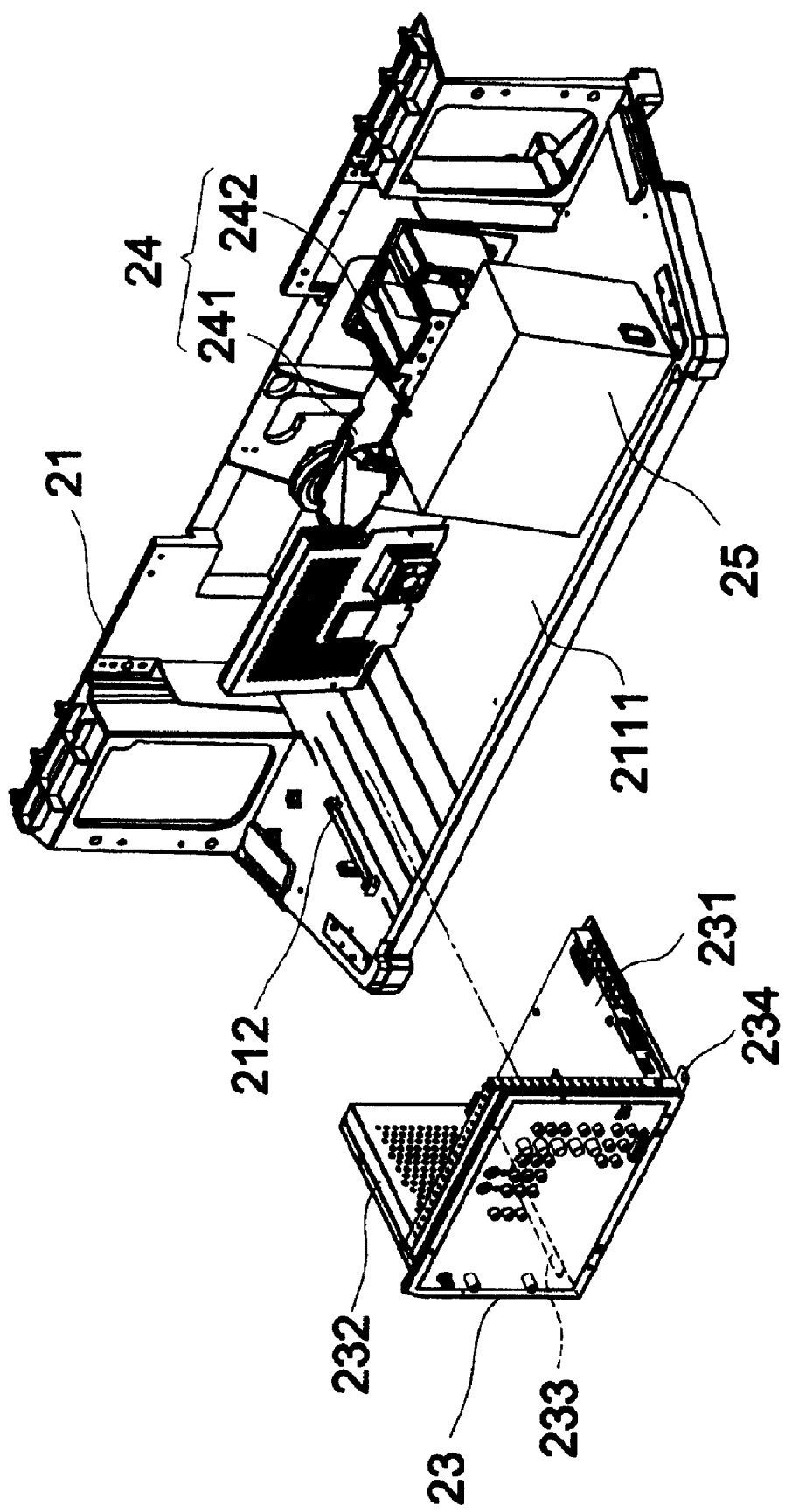
Figure 5:
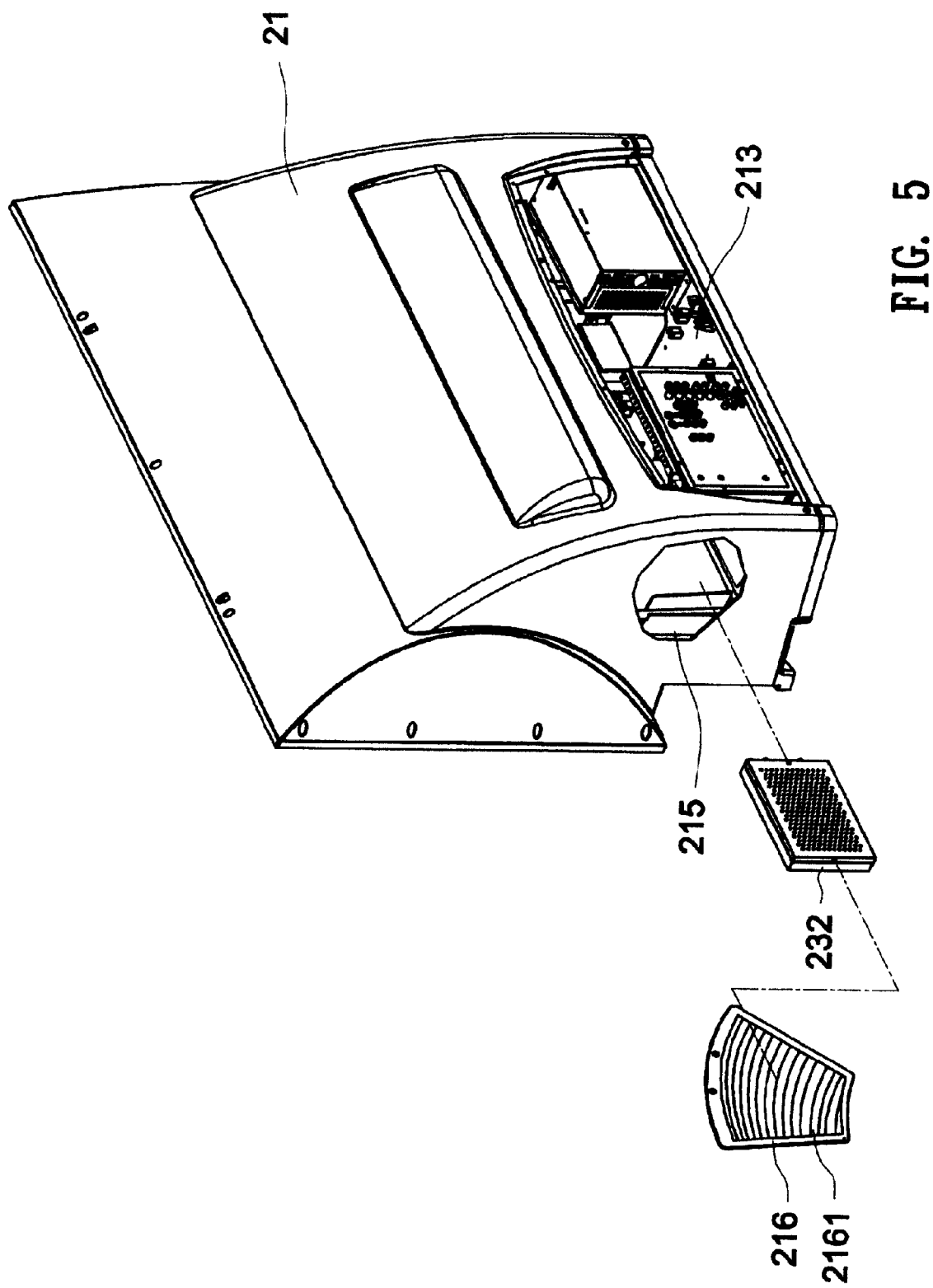
FIG. 5 is a schematic view of a dismountable tuner of an easy-to-maintain rear projection television according to one embodiment of the invention.
Figure 6A:
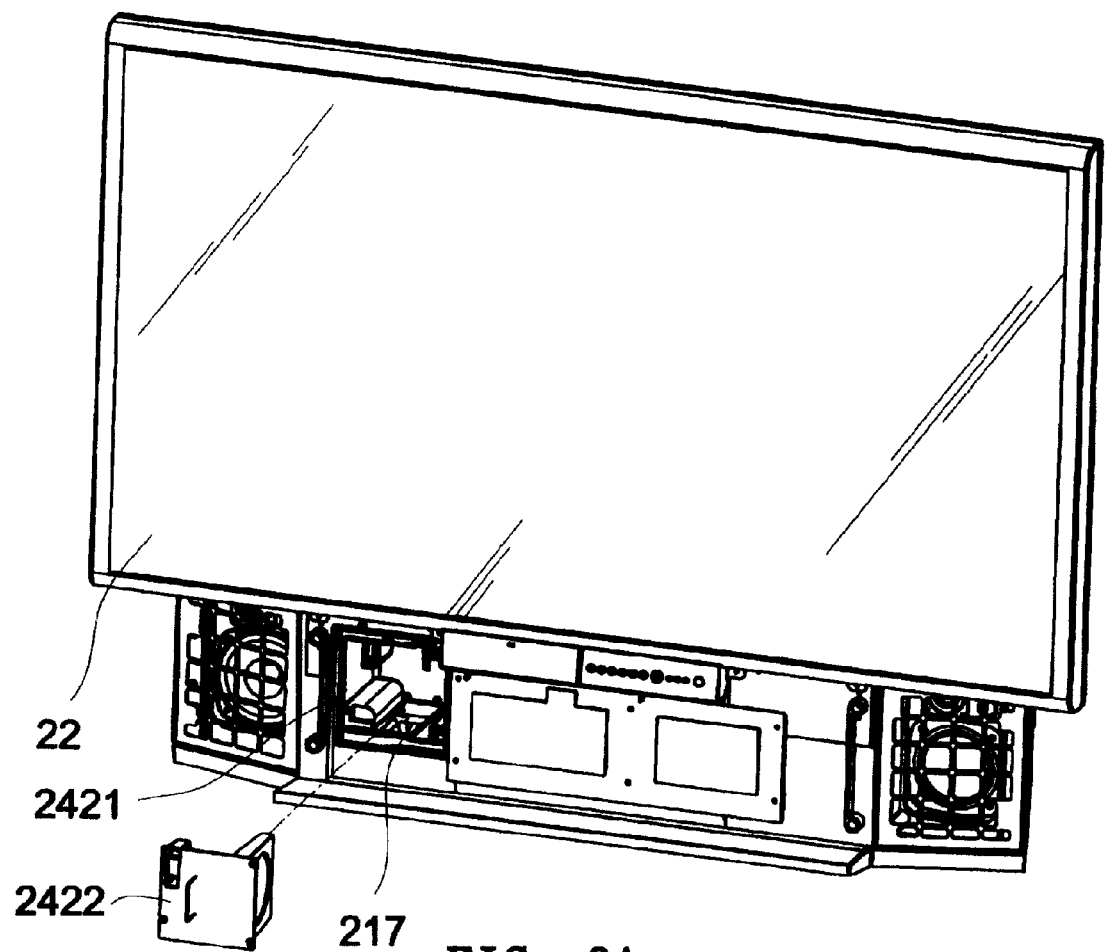
FIG. 6A and FIG. 6B are schematic views of dismountable bulbs of an easy-to-maintain rear projection television according to one embodiment of the invention.

Referring to FIG. 4A and FIG. 4B, a guiding element 212 is mounted on an inner bottom 2111 inside the space 211. The guiding element 212 is a reversed L-shape plate and is vertically mounted on the inner bottom 2111 to form a channel. A first maintenance hole 213 is formed through a rear side of the casing 21 and is covered with a first lid 214. Referring to FIG. 5, a second maintenance hole 215 is formed through a lateral side of the casing 21. The second maintenance hole 215 is covered with a second lid 216 having a vent hole 2161 as an exit for heat dissipation. Inner elements can be directly repaired or maintained after the second lid 216 is dismounted. Referring to FIG. 6A, a third maintenance hole 217 is formed through a lower part of a front side of the casing 21. A reflector (not shown) is mounted in a path of image beams projected onto a display screen 22, so that the image beams reach the display screen 22.

Figure 6B:
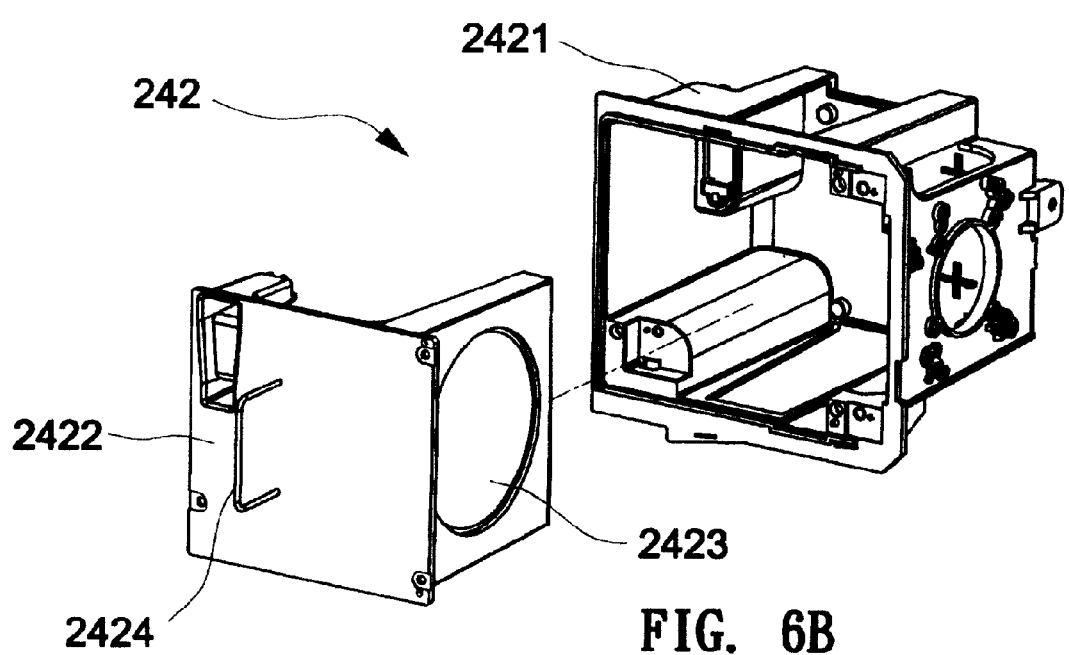

Referring to FIG. 4B, control switches needed for image displaying of the rear projection television are modularized into several units including an electronic unit 23, a light engine 24 and a power supply unit 25. All the units are mounted inside the space 211. The electronic unit 23 includes a main board 231 and a plurality of auxiliary modules such as a cable TV tuner 232 inserted in the main board 231. The electronic unit 23 is mounted inside the casing 21 at a rear end, adjacent to the first maintenance hole 213. A guiding piece 233 and an ear 234 respectively protrude from a periphery of a bottom of the electronic unit 23. The guiding piece 233 corresponds to the guiding element 212. The guiding element 212 of the casing 21 forms a channel to guide the electronic unit into the casing 21. Then, a crew inserts through the ear 234 to fasten the electronic unit 23 on the inner bottom 2111 of the space 211. Referring to FIG. 5, the tuner 232 is mounted onto the main board 231 next to the second maintenance hole 215. The second maintenance hole 215 has a diameter through which the tuner 232 passes. The light engine 24 includes an optical module 241 and a set of bulbs 242. The optical module 241 is mounted at an inner front of the casing 21. The set of bulbs 242 is mounted adjacent to the third maintenance hole 217. The optical module 241 includes optical elements such as a spectrometer, a light valve, and a lens. Referring to FIG. 6B, the set of bulbs 242 includes a fixed basket 2421 and a dismountable basket 2422. A replaceable bulb 2423 is mounted inside the dismountable basket 2422. The fixed basket 2421 and the optical module 241 form a unitary body. The dismountable socket 2422 and the fixed socket 2421 are combined together via bolts. When the dismountable basket 2422 is dismounted for replacement of the bulb 2423, the position of the optical module 241 is not changed and the original light path is not changed either. A handle portion 2424 is further formed at a front of the dismountable basket 2422 for convenient dismount of the basket 2422. Referring to FIG. 4A and FIG. 4B, the power supply unit 25 is mounted at an inner rear of the casing 21 near the first maintenance hole 213. The power supply unit 25 is a rectangular body. Another ear 251 is formed on the power supply unit 25 near the first maintenance hole 213 for a bolt to penetrate through so as to fasten the power supply unit 25 onto the inner bottom 2111 of the casing 21. The ears 234, 251 are positioned near the maintenance hole 213 to provide a sufficient space for dismount of the bolt by a tool.

When one component inside the casing 21 needs repairing, only the lid corresponding to the component to be repaired needs dismounting so that the component in question is taken from the casing via the corresponding maintain hole. In detail, referring to FIG. 4A and FIG. 4B, when the main board 231 of the electronic unit 23 is to be repaired, the first lid 214 is dismounted and then the crew is loosened. The electronic unit 23 as a whole slides out of the space 211 along the guiding element 212 and the guiding piece 233.

After repairing is completed, the electronic unit 23 is placed to its initial position. When the tuner 232 of the electronic unit 23 is to be repaired, the second lid 216 is dismounted for the user or worker to put his or her hands into the second maintenance hole 215 to take the tuner 232 out for repairing. When the bulb needs to be replaced, the third lid is dismounted to expose the handle portion 2424 of the set of bulbs 242. The screw fastening the fixed basket 2421 and the movable basket 2422 are loosened to pull out the movable basket 2422 by means of the handle portion 2424. Then, a new bulb is put in place in the casing. When the power supply unit 25 needs repairing, only the first lid 214 needs to be dismounted and the bolt is loosened to take out and repair the power supply unit 25.

As described above, when the electronic unit 23, bulb 24 or the power supply unit 25 need repairing, only the lid needs to be dismounted an then the above components are taken out through their corresponding holes without changing the location of the rear cover or the front frame. Therefore, the repair processing takes a shorter time and is more convenient. Furthermore, the light projection path is not affected, providing an improved image quality.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

The invention claimed is:

1. A rear projection television, comprising:
  a casing, having a cavity therein;
  a first maintenance hole formed through the casing and covered with a removable first lid, the first maintenance hole providing access to an electronic unit of the rear projection television located in the cavity;
  a second maintenance hole formed through the casing and covered with a removable second lid, the second maintenance hole providing access to a tuner of the rear projection television located in the cavity; and
  a third maintenance hole formed through the casing and covered with a removable third lid, the third maintenance hole providing access to a set of bulbs of the rear projection television located in the cavity.

2. The television of claim 1, wherein the second lid has a vent hole.

3. The television of claim 1, wherein the set of bulbs includes a fixed basket and a movable basket screwed onto the fixed basket, and the movable basket has a dismountable bulb.

* * * * *